Nov. 26, 1968     R. A. FOOTNER     3,413,389
METHOD OF MANUFACTURING A COMPOSITE SEALING STRIP
Filed July 21, 1965     2 Sheets-Sheet 1
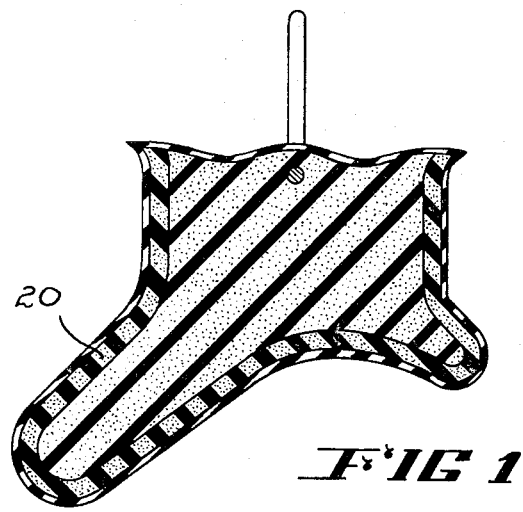
FIG 1
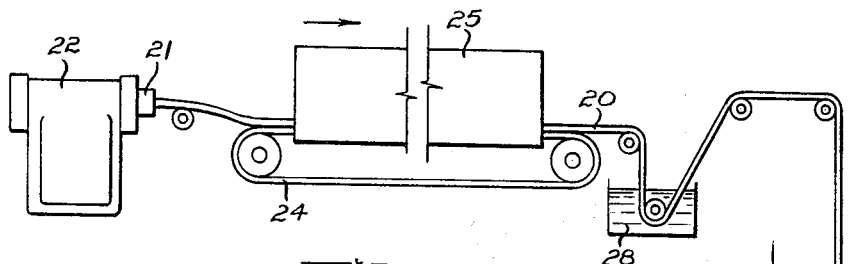
FIG 2
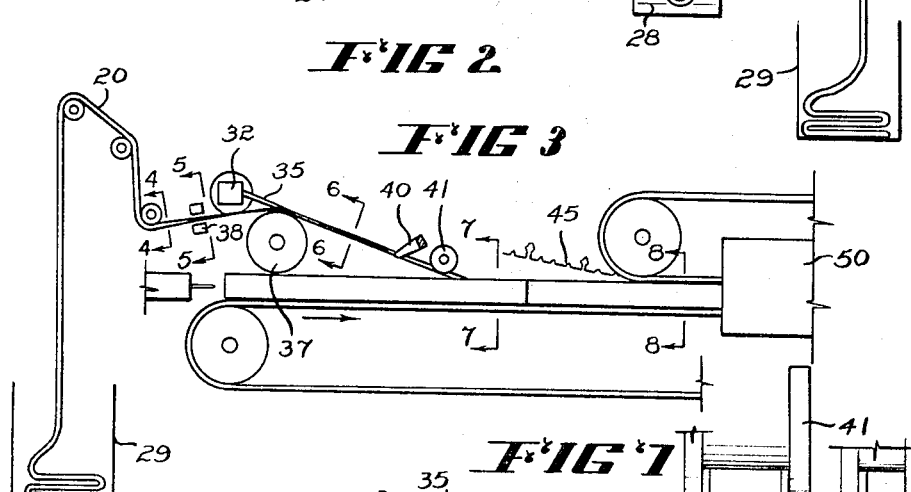
FIG 3
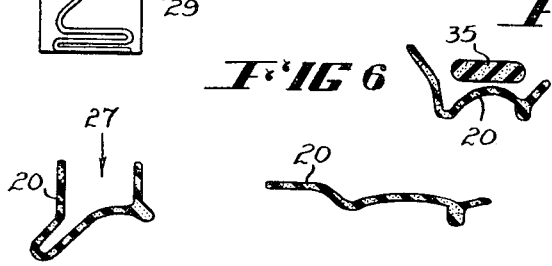
FIG 6
FIG 4    FIG 5
FIG 7
INVENTOR
ROBERT A. FOOTNER
BY *Oldham & Oldham*
ATTORNEYS Nov. 26, 1968  R. A. FOOTNER  3,413,389
METHOD OF MANUFACTURING A COMPOSITE SEALING STRIP
Filed July 21, 1965  2 Sheets-Sheet 2

INVENTOR
ROBERT A. FOOTNER
BY Oldham & Oldham
ATTORNEYS

United States Patent Office 3,413,389
Patented Nov. 26, 1968

3,413,389
METHOD OF MANUFACTURING A
COMPOSITE SEALING STRIP
Robert A. Footner, Edwardstown, South Australia, Australia, assignor to S.A. Rubber Mills Pty. Ltd., Edwardstown, South Australia, Australia
Filed July 21, 1965, Ser. No. 473,735
9 Claims. (Cl. 264—46)

ABSTRACT OF THE DISCLOSURE

A sealing strip formed from a layer of sponge material having low water absorption properties disposed over an inner core of sponge material having plastic memory properties.

Figure 8:
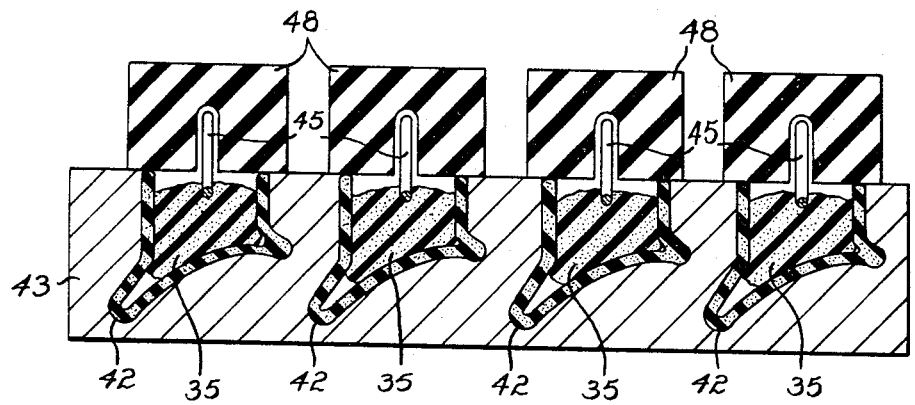

This invention relates to a method of manufacturing a composite sealing strip.

It has already been proposed to form composite sealing strips by moulding, for example, natural foam or sponge rubber which has good plastic "memory" characteristics, in a die, and dipping the moulded product in a synthetic coating material such as neoprene or hypalon to thereby form a skin on the outer surface, the effect of which is to reduce moisture absorption into the sponge and improve resistance to oxidation. This is a method which is frequently used in practice, but the skin which is formed on the outer surface of the sponge is thin and is backed by a communicating cell sponge and for this reason its life is very short. Secondly, the production cost is high if the rubber is moulded in individual lengths by known methods.

The main object of this invention is to provide a method of manufacturing a composite sealing strip section which possesses the advantage of a skin of material which will resist moisture absorption and deterioration due to exposure to the atmosphere and sunlight for longer periods than obtained with the previously proposed methods described above, and will contain an inner core of sponge which has the desired memory characteristics. A further object of this invention is directed to an improved method of manufacturing such a composite article so that the skin is backed by a layer of sponge material which will have improved weathering characteristics, and a still further object is to provide a method wherein the production cost can be reduced to much less than the cost of moulding in individual lengths.

Basically the invention may be described as lying in a sealing strip which includes a layer of fine cell sponge material having properties for resisting deterioration due to exposure and a low water absorption over an inner core of sponge material having the desired plastic memory characteristics. The method of producing such a strip according to this invention may be basically described as precuring an outer non-communicating sponge covering to a hollow shape, inserting an uncured sponge within the hollow shape and expanding to fill or partly fill the hollow, and curing the sponge insert while within the outer sponge covering. Other features of the invention may be determined by reference to the claims which describe it.

It will be immediately seen that the invention need not be limited to a layer of sponge material which has non-intercommunicating voids, although this is preferable, but could be extended to include a layer of sponge material having intercommunicating voids; it will be seen that the invention need not be limited to a composite sealing strip containing two only sponge materials but the number of different materials used can be increased if it is desired to make use of properties not available in the two chosen materials. It will also be seen that the invention can be applied either for batch production for example moulding in dies or alternatively for continuous production, for example extruding in strip form, either into a mould or a vulcanizing media.

Figure 9:
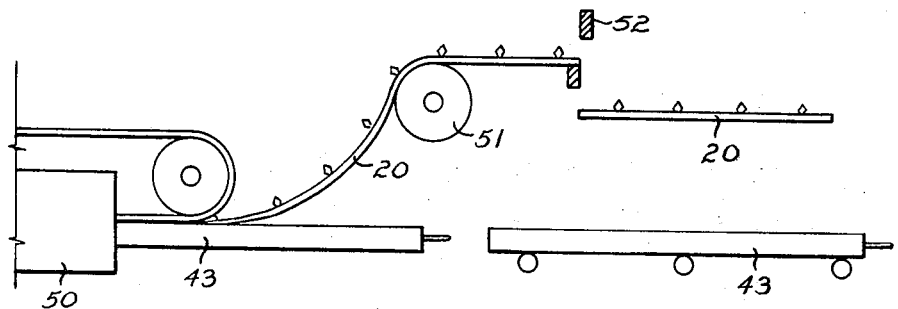
Figure 10:
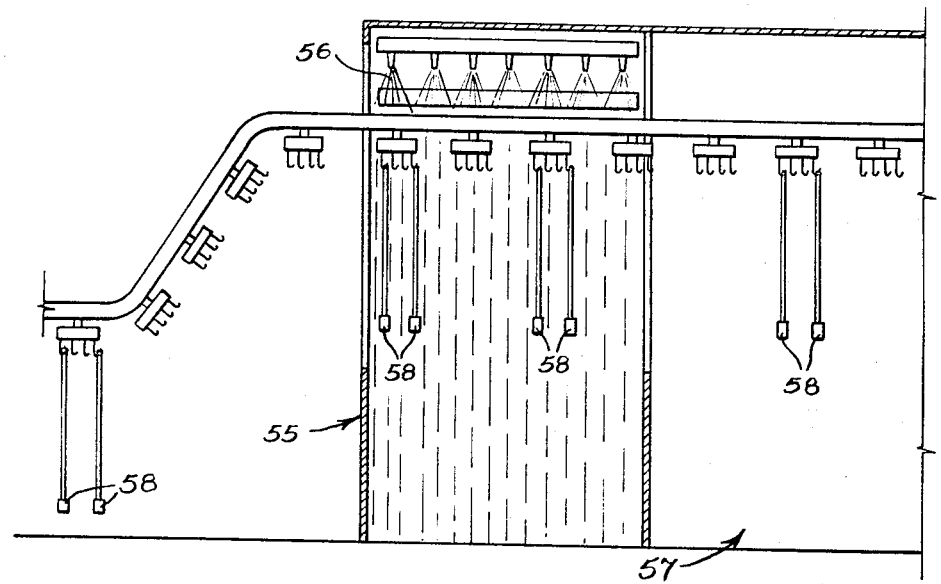

In order for the invention to be more clearly understood an embodiment is described hereunder with reference to and is illustrated in the accompanying drawings, in which:

FIG. 1 is a section, much enlarged, of a sealing strip according to this invention, FIG. 2 illustrates diagrammatically the first stage in the method of producing such a sealing strip, that is, the extrusion and pre-curing of a layer for the strip, FIG. 3 illustrates diagrammatically the second stage in the method, that is, inserting an uncured sponge within the hollow of the layer, FIG. 4 is a section through the layer at 4—4 of FIG. 3, FIG. 5 is a section through the layer at 5—5 of FIG. 3 showing the layer flattened, FIG. 6 is a section through the layer at 6—6 of FIG. 3 showing an inner uncured sponge rod in the hollow of the layer, FIG. 7 is a section taken on line 7—7 of FIG. 3, FIG. 8 is a section taken on line 8—8 of FIG. 3, FIG. 9 shows diagrammatically the stage of production where the strip moves outwardly from an inner sponge curing oven and is cut to length, and FIG. 10 shows diagrammatically the final stages of coating and finally curing the strip.

According to this embodiment, a series of layer members 20 are extruded simultaneously in strip form through a series of cavity dies 21 on an extruder head 22, the material being used for the outer covering member being a non-intercommunicating neoprene or hypalon sponge complying with the SAE standard SC43CLP. The extrusion is in the form of a hollow member which when viewed in end section defines an open hollow figure (see FIG. 4), but if desired a closed figure may be extruded. The extrusion apparatus is arranged at one end of a long belt 24 which in this embodiment is formed from thin strip metal, and this belt constitutes conveyor means which convey the extruded strips through a tunnel 25, the tunnel 25 having a passage of hot air therethrough. The air is heated to a curing temperature which in this embodiment is within the range of 250° F. to 350° F., and the extruded strips emerge from the delivery end of the tunnel 25 in a cured form. It will of course be seen however that if the strips were made in the batch process they would be removed from the mould in a cured form, the mould being heated in the usual way to achieve this result.

After the strips emerge from the tunnel 25 the hollow portions 27 of the strips are dipped in talc 28 and stored in bins 29 (FIG. 2). Upon further processing (FIG. 3), the strips are placed beneath extrusion apertures of a second extrusion head 32 through which a sponge rubber (or if desired a synthetic polymer or foam latex) which in this embodiment complies with SAE ASTM specification R10 to R15, is extruded. By this means each of the hollows 27 has an extruded rod 35 of sponge rubber formed therein, the layer member strip 20 being opened or flattened into the correct position to receive this extrusion by means of guide rollers 37 which are adjacent guides 38. This is shown in FIG. 5. The strip then passes between further guide fingers 40 and between the flanges of closure rollers 41 to return it sufficiently to enter guide slots 42 in travelling die sections 43 which are abutted in end to end aligned relationship. A wire key 45 which is to be used to retain each sealing strip to a motor vehicle, for example, is positioned in the hollow a little beyond the rollers 41, and is retained in correct position by a conveyor belt 48, there being four such belts. FIG. 8 shows the sponge rod 35 partly expanded due to die heat.

The travelling die sections 43 which are abutted end to end in an aligned relationship travel through a second tunnel 50 which constitutes an inner sponge curing oven which is heated to a temperature of between 250° F. and 400° F. so that the in-fill is cured while within the outer sponge covering which is itself contained in a slot 42 of complementary shape. The die sections are driven by drive rollers (not shown) disposed one on each side, the sections passing through the tunnel and upon emergence the strips are lifted from the grooves of the sections, the sections are moved transversely and returned to the initial position where they are again moved transversely into alignment with the tunnel, and initial movement is started by means of an air cylinder. This arrangement is not shown in the drawings.

FIG. 9 shows the now composite strips 20 being lifted from the grooves 42 of the travelling die sections 43 by wheels 51, and cut to length by the guillotine 52.

The product from the above process is found to comply with most requirements, but in the event that even higher resistance to water absorption, atmospheric cracking, or other special requirements are called for, the completed strip then passes through a cascade type coating booth 55 (FIG. 10) wherein a downward flow of coating synthetic rubber material 56 (in this embodiment being a neoprene and hypalon) passes over the outer surface of the strip, and the strip is again heated in a final curing oven 57 to cure the skin so formed. ("Neoprene" is a trade name for chloroprene rubber and "Hypalon" for chlorosulphonated polyethylene rubber.) The strips hang with weights 58 on their lower ends in these final processes.

It is found that a strip constructed according to this embodiment has the advantages of an outer covering which is resilient, and although not possessing the desired plastic memory, nevertheless possesses the desired water absorption and other characteristics and is more resistant to abrasion and atmospheric ageing than the material which has an improved plastic memory which comprises the in-fill. The advantage of passing the strip through the coating material moving in a cascade in lieu of spraying is that the aromatics of the coating material are thereby not lost to such an extent and a more even coating is achieved.

A consideration of the above embodiment will indicate that the invention provides a method of producing a sealing strip of superior quality which is nevertheless lower in cost than previously proposed methods. It will of course be seen that the methods can be widely varied, and for example the initial extrusion of the covering material can be into a travelling mould, or can be supported by a flow of hot air. In the event of a mould being used, this can take the place of a moving die section as described in the above embodiment, or can consist of a series of grooved rollers or belts which move in spaced diverging relationship with each other. It will be seen that the invention can be used with key means of any one of a plurality of forms, including key wire or strip, or if desired a key portion forming part of the rubber cross section. However it will be seen that these and other similar variations lie within this invention.

While one complete embodiment of the invention has been disclosed herein, it will be appreciated that modification of this particular embodiment of the invention may be resorted to without departing from the scope of the invention as defined in the appended claims.

What I claim is:

1. The method of producing a sealing strip having an inner layer and an outer layer, comprising precuring the outer layer of sponge material possessing properties of low water absorption and high resistance to deterioration under exposure conditions, positioning an inner uncured sponge along said outer layer, and heating the uncured sponge thereby expanding it, uniting it with the outer layer, and curing it.

2. The method of producing a sealing strip having an inner layer and an outer layer, comprising precuring the outer layer when in a hollow cross-sectional shape, said layer being of sponge material possessing properties of low water absorption and high resistance to deterioration under exposure conditions, inserting an inner uncured sponge within the hollow of said outer layer, and heating the uncured sponge thereby expanding it to fill said hollow, uniting it with the outer layer, and curing it while within said hollow.

3. The method of producing a sealing strip having an inner layer and an outer layer, comprising extruding and then precuring the outer layer when in a hollow cross-sectional shape, said layer being of sponge material possessing properties of low water absorption and high resistance to deterioration under exposure conditions, extruding a rod to form an inner uncured sponge within the hollow of said outer layer, and heating the uncured sponge thereby expanding it to fill said hollow, uniting it with the outer layer, and curing it while within said hollow.

4. The method of producing a sealing strip having an inner layer and an outer layer, comprising precuring the outer layer when in an open hollow cross-sectional shape, said layer being of sponge material possessing properties of low water absorption and high resistance to deterioration under exposure conditions, extruding an inner uncured sponge rod into the hollow of said outer layer, inserting a wire key into the open hollow, the wire key projecting therefrom at spaced points, and heating the uncured sponge thereby expanding it to fill said hollow, uniting it with the outer layer, and curing it while within said hollow.

5. The method of producing a sealing strip comprising the steps:
  (a) extruding a layer of fine non-intercommunicating cell sponge, the cross-sectional shape of the layer defining an open hollow,
  (b) precuring the layer at super atmospheric temperature,
  (c) depositing a rod of uncured sponge into the open hollow of the layer, the uncured sponge having, upon curing, a relatively coarse intercommunicating cell structure,
  (d) the layer being positioned in a die, and
  (e) expanding and curing the uncured sponge while the layer is held in the die thereby uniting it with the layer.

6. The method of producing a sealing strip comprising the steps:
  (a) extruding a layer of fine non-intercommunicating cell sponge, the cross-sectional shape of the layer defining an open hollow,
  (b) precuring the layer at a temperature of between 250° F. and 350° F.,
  (c) extruding a rod of uncured sponge into the open hollow of the layer, the uncured sponge having, upon curing, a relatively coarse intercommunicating cell structure,
  (d) the layer being positioned in a die,
  (e) expanding and curing the uncured sponge while the layer is held in the die thereby uniting it with the layer,
  (f) coating the lengths with chloroprene rubber or chlorosulphonated rubber, and
  (g) curing the coating.

7. The method of producing a sealing strip comprising the steps:
  (a) extruding a layer of fine non-intercommunicating cell sponge complying with SAE standard SC43CLP and composed of either chloroprene rubber or chlorosulphonated polyethylene rubber, the cross-sectional shape of the layer defining an open hollow, (b) precuring the layer at a temperature of between 250° F. and 350° F.,
(c) extruding a rod of uncured sponge into the open hollow of the layer, the uncured sponge having, upon curing a relatively coarse intercommunicating cell structure and complying with SAE ASTM specifications R10 to R15,
(d) inserting a wire key into the open hollow, the wire key projecting therefrom at spaced points,
(e) the layer being positioned in a die,
(f) expanding and curing the uncured sponge, while the layer is held in the die, at a temperature of between 250° F. and 400° F., thereby uniting it with the layer,
(g) cutting the cured strip into lengths,
(h) coating the lengths with chloroprene rubber or chlorosulphonated rubber, and
(i) curing the coating.

8. The method of producing a sealing strip as in claim 5 and including the step of positioning the layer in a die before depositing the rod of uncured sponge therein.

9. The method of producing a sealing strip as in claim 5 and including the step of positioning the layer in a die after depositing the rod of uncured sponge therein.

References Cited

UNITED STATES PATENTS

| 2,319,042 | 5/1943 | De Wyk | 264—47 |
| 2,357,513 | 9/1944 | Harmon | 264—46 XR |
| 3,108,852 | 10/1963 | Olsen | 49—485 XR |

FOREIGN PATENTS 610,686  12/1960  Canada.

JULIUS FROME, *Primary Examiner.*

PHILIP E. ANDERSON, *Assistant Examiner.*